United States Patent [19]

Matsushita et al.

[11] Patent Number: 4,822,182
[45] Date of Patent: Apr. 18, 1989

[54] ROTARY MOTION DRIVING APPARATUS

[75] Inventors: Koichi Matsushita, Chiba; Hiroyuki Suzuki, Ushiku, both of Japan

[73] Assignee: Canon Kabushiki Kaisha, Tokyo, Japan

[21] Appl. No.: 222,333

[22] Filed: Jul. 20, 1988

Related U.S. Application Data

[63] Continuation of Ser. No. 143,111, Jan. 12, 1988, abandoned.

[30] Foreign Application Priority Data

Jan. 14, 1987 [JP] Japan ................................ 62-004996

[51] Int. Cl.$^4$ ............................................. F16C 33/72
[52] U.S. Cl. .................................. 384/107; 384/119; 384/144; 384/471
[58] Field of Search ............... 384/107, 144, 471, 119, 384/124, 480, 12

[56] References Cited

U.S. PATENT DOCUMENTS

| | | | |
|---|---|---|---|
| 2,950,150 | 8/1960 | Ashworth | 384/471 |
| 3,450,448 | 6/1969 | Weichsel | 384/107 |
| 3,828,610 | 8/1974 | Swearingen | 384/107 |
| 4,402,514 | 9/1983 | Ryan et al. | 384/144 |
| 4,448,460 | 5/1984 | Yamamoto | |
| 4,652,149 | 3/1987 | Nakaoka et al. | 384/100 |
| 4,749,283 | 6/1988 | Yokomatsu et al. | 384/12 |

Primary Examiner—Lenard A. Footland
Attorney, Agent, or Firm—Fitzpatrick, Cella, Harper & Scinto

[57] ABSTRACT

A rotary motion driving apparatus includes a gas bearing assembly for supporting a rotatable shaft and is usable in any ambience such as a vacuum ambience. The rotatable shaft has two flange-like collar portions formed on the opposite ends of the rotatable shaft. The collars are used as the members to be supported by the gas bearing assembly with respect to the thrust direction. A driving motor has a rotor and a stator, the rotor being fixed to one of the collars of the rotatable shaft and the stator being fixed to the gas bearing assembly. The other collar of the rotatable shaft functions as an output end of the rotary drive produced by the motor. Around such drive outputting collar of the rotatable shaft, a sealing plate having a plurality of grooves or recesses is provided. The sealing plate is maintained out of contact with the collar, and suitable vacuum is supplied to the grooves of the sealing plate. A casing is fixed to the sealing plate to thereby define a predetermined space within which the gas bearing assembly and the driving motor are accommodated. With this arrangement, the driving apparatus can function as a source for supplying a rotary drive with high rotational precision, even when the apparatus is used in a vacuum ambience.

2 Claims, 1 Drawing Sheet

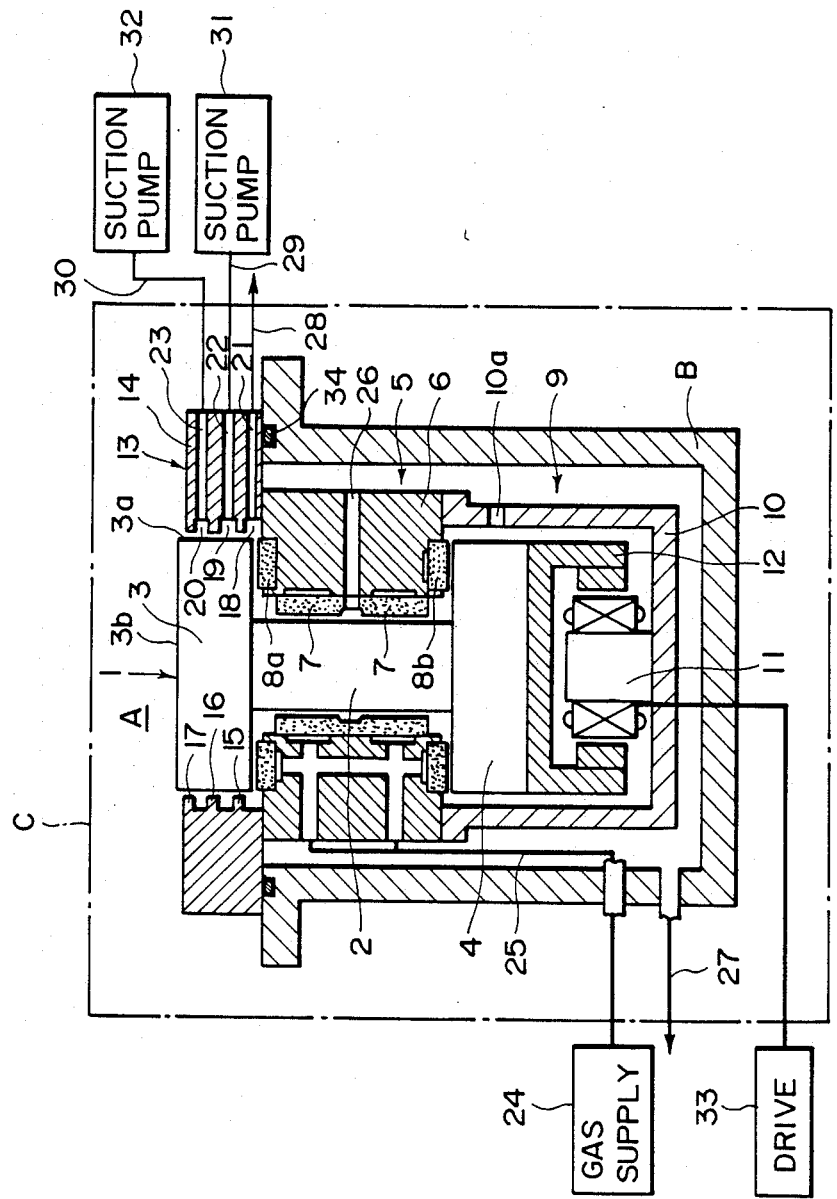

ROTARY MOTION DRIVING APPARATUS

This application is a continuation of application Ser. No. 143,111 filed Jan. 12, 1988, abandoned.

FIELD OF THE INVENTION AND RELATED ART

This invention relates to a rotary motion driving apparatus and, more particularly, to a rotary motion driving apparatus which uses a gas bearing.

A rotary motion driving apparatus of the type using one or more gas bearings can provide high rotational precision and high durability. For this reason, it can be incorporated into a high-precision machining apparatus, a high-precision measuring apparatus or otherwise.

It is not easy to use such a rotary motion driving apparatus in a vacuum ambience. The difficulty results from the necessity of avoiding leakage of a gaseous fluid from the gas bearing into the vacuum ambience which causes an undesirable decrease in the degree of vacuum in the ambience. Namely, the provision of sealing means tends to deteriorate the rotational precision to be provided by the gas bearing. For example, if an elastomeric material member or a magnetic fluid is used to seal a clearance between the gas bearing and a rotational shaft to be supported by the gas bearing, the elastomeric material member or the magnetic fluid contacts a portion of the rotational shaft. As a result, high rotational precision can not be retained.

SUMMARY OF THE INVENTION

It is accordingly a primary object of the present invention to provide a rotary motion driving apparatus which can be used in any ambience such as, for example, a vacuum ambience without damaging high rotational precision and high durability.

These and other objects, features and advantages of the present invention will become more apparent upon a consideration of the following description of the preferred embodiments of the present invention taken in conjunction with the accompanying drawings.

BRIEF DESCRIPTION OF THE DRAWING

The attached drawing is a vertical section schematically and diagrammatically showing a rotary motion driving apparatus according to one embodiment of the present invention.

DESCRIPTION OF THE PREFERRED EMBODIMENTS

As shown in the drawing, the rotary motion driving apparatus according to one embodiment of the present invention includes a rotatable shaft 1 having an axially extending shaft portion 2 and two disc-like collars 3 and 4 fixedly provided (as flange-like portions) on the opposite ends of the shaft portion 2. The collars 3 and 4 function as "thrust plates" which are the members to be supported in the thrust direction. Each of the collars 3 and 4 has a diameter which is larger than that of the shaft portion 2. The collar 3 has an upper face 3c which serves as a rotary drive outputting portion. An article to be rotationally driven will be placed on or mounted to the upper face 3b of the collar 3. Denoted generally at 5 in the drawing is a gas bearing assembly which includes a housing 6, a bearing pad 7 having a cylindrical shape and being made of a porous material, and two bearing pads 8a and 8b each having a ring-like shape and being made of a similar porous material. The gas bearing assembly 5 is adapted to discharge a gaseous fluid such as air to the surface of the shaft 1 to thereby support the same statically. Denoted generally at 9 in the drawing is a motor which functions as a source for providing a rotational drive. The motor 9 has a cover 10, a stator 11 stationarily fixed to the cover 10 and a rotor 12 mounted to the collar 4 of the shaft 1. The motor 9 operates to rotationally drive the shaft 1 about an axis (not shown) which extends vertically as viewed in the drawing. The stator 11 has a coil, while the rotor 12 has a magnet. Thus, as understood, the motor 9 is of a well-known "outer rotor type".

Gas seal 13 is provided at the top of the driving apparatus. The seal 13 includes a housing 14 having formed thereon a plurality of partition walls 15, 16 and 17. These partition walls are formed so as to surround an outer circumferential surface 3a of the collar 3 with a minute clearance maintained between the surface 3a and the walls 15-17. Thus, the partition walls 15-17 can function as a "labyrinth seal". Further, the housing 14 has formed therein a gas exhausting portion 18, two gas attracting grooves 19 and 20, an exhaust passage 21 and two gas-attracting exhaust passages 22 and 23.

The rotatable shaft 1 is hydrostatically supported by the gas bearing assembly 5, as described. Further, the cover 10 of the motor 9 is mounted to the housing 6 of the gas bearing assembly 5. Also, the seal housing 14 of the gas seal 13 is mounted to the housing 6 of the gas bearing assembly 5. Thus, the rotatable shaft 1, the gas bearing assembly 5, the motor 9 and the gas seal 13 cooperate to provide a rotary motion driving assembly A.

The rotary motor driving assembly A is accommodated in a casing B, as shown in the drawing. The seal housing 14 of the gas seal 13 is fixed to the casing B, whereby the rotary motion driving assembly A is supported at the illustrated position by the casing B. The rotary motion driving assembly A is placed, together with the casing B, in a vacuum chamber schematically illustrated by a phantom line C in the drawing.

The casing B has a gas-tight structure and a suitable sealing means is provided on the top of the casing B which contacts the seal housing 14, in order to prevent leakage of the gaseous fluid. In this embodiment, an O-ring seal 34 is used to prevent the gas leakage.

In operation of the driving apparatus, a gaseous fluid is supplied from a gas supply source 24 which is placed outside the vacuum chamber C. From the source 24, the gaseous fluid flows through a passageway 25 and is discharged into a clearance defined between the bearing pad 7 and the shaft portion 2; a clearance defined between the bearing pad 8a and the collar 3; and a clearance defined between the bearing pad 8b and the collar 4. Thus, the discharging gaseous fluid supports the shaft 1 with respect to the radial direction and the thrust direction. Thereafter, the gaseous fluid flows into the interior of the casing B from an exhaust passage 26 formed in the housing 6 and an exhaust port 10a formed in the cover 10. Subsequently, the gaseous fluid is discharged through a passageway 27, outwardly of the chamber C into the atmosphere.

On the other hand, a portion of the gaseous fluid supplied into the clearance between the thrust bearing pad 8a and the thrust collar 3 flows into the gas exhausting portion 18. From the portion 18, the gaseous fluid is exhausted to the atmosphere, outside the chamber C, by way of the exhaust passage 21 and a passageway 28 connected thereto. At this time, only a portion of the gaseous fluid within the exhaust portion 18 will flow along the circumferential surface 3a of the collar 3 toward the vacuum ambience in the chamber C. However, there is a large flow resistance because the clearance between the partition 15 and the circumferential surface 3a of the collar 3 is very small. As a result, only a limited amount of gaseous fluid will leak into the groove 19. Additionally, the groove 19 is forcibly evacuated by means of a suction pump 31, disposed outside the chamber C, by way of the gas-attracting passage 22 and a passageway 29 connected thereto. Therefore, the pressure in the groove 19 is maintained low. Further, the partition 16 provides a flow resistance. Also, the groove 20 is forcibly evacuated by means of another suction pump 32, placed outside the chamber C, by way of the gas-attracting passage 23 and a passageway 30 connected thereto. Additionally, the partition 17 provides a flow resistance. With this arrangement, only a very small amount of gaseous fluid will leak into the chamber C.

External drive control 33 applies a controlled electric voltage to the coil of the stator 11 to actuate the motor 9, whereby the shaft 1 is rotated. As illustrated, the motor 9 is of a brushless type so that the stator 11 is out of contact with the rotor 12. Further, the gas seal 13 does not contact the shaft 1. Accordingly, high rotational precision as attainable by the gas bearing assembly 5 is not deteriorated when the driving apparatus is used in a vacuum ambience, such as the vacuum chamber C. Therefore, the shaft 1 can be rotationally driven with high precision.

Additionally, the inside of the casing B can be maintained substantially at an atmospheric pressure. Therefore, if it is desired to magnetically shield the motor 9, it is not necessary to use any specific shielding method or material in consideration of use in the vacuum.

While, in the illustrated embodiment, porous bearing pads are used in the gas bearing assembly 5, the gas bearing assembly may of course be of a type using orifice restriction or any other known restriction means.

While not shown in the drawing, the driving apparatus is provided with a suitable detecting device for detecting the revolution of the motor 9. Such detecting device may be a rotary encoder or otherwise which is effective to detect the angle of rotation of the motor 9. If such detecting means is used to control the angle of rotation of the motor 9, the driving apparatus can be used as a high-precision angular indexing table. On the other hand, a tachometer generator or otherwise which is effective to detect the speed of rotation of the motor may be used. If such detecting means is used, the driving apparatus can be used as a rotary motion driving apparatus with the number of revolutions being controllable.

While the invention has been described with reference to the structures disclosed herein, it is not confined to the details set forth and this application is intended to cover such modifications or changes as may come within the purposes of the improvements or the scope of the following claims.

What is claimed is:

1. A rotary motion driving apparatus, comprising:
    a rotatable shaft having a shaft portion extending in an axial direction and two flange-like portions formed on opposite ends of said shaft portion;
    a gas bearing assembly actable on said shaft portion and said flange-like portions so as to support said rotatable shaft with respect to said axial direction and a rotational direction about said axial direction;
    a driving motor operable to rotate said rotatable shaft, said driving motor having a rotor, a stator and a cover, wherein said rotor is fixed, as a unit, to said rotatable shaft via one of said flange-like portions of said rotable shaft and wherein said stator is maintained out of contact with said rotor and is fixed, as a unit, to said gas bearing assembly via said cover;
    a casing for accommodating at least said gas bearing assembly and said driving motor; and
    sealing means cooperable with said casing so as to place at least said gas bearing assembly and said driving motor in a substantially closed space, said sealing means having a plurality of partitions each being formed so as to surround the other of said flange-like portions of said rotatable shaft with a minute clearance maintained therebetween.

2. An apparatus according to claim 1, wherein a space is defined between adjacent partitions of said sealing means and wherein said sealing means includes a suction pump which is in fluid-communication with said space defined between adjacent partitions.

* * * * *

UNITED STATES PATENT AND TRADEMARK OFFICE
CERTIFICATE OF CORRECTION

PATENT NO. : 4,822,182

DATED : April 18, 1989

INVENTOR(S) : Matsushita, et al.

It is certified that error appears in the above-identified patent and that said Letters Patent is hereby corrected as shown below:

COLUMN 2

Line 35, change "rotary motor driving assembly A" to -- rotary motion driving assembly A--.

Signed and Sealed this

Fifteenth Day of May, 1990

Attest:

HARRY F. MANBECK, JR.

*Attesting Officer*     *Commissioner of Patents and Trademarks*